United States Patent [19]

Fernicola

[11] 4,035,603
[45] July 12, 1977

[54] FAULT DETECTOR SYSTEM FOR STARTING PLASMA ARC WORKING APPARATUS

[75] Inventor: Robert C. Fernicola, Florence, S.C.

[73] Assignee: Union Carbide Corporation

[21] Appl. No.: 672,478

[22] Filed: Mar. 31, 1976

[51] Int. Cl.$^2$ .......................................... B23K 9/10
[52] U.S. Cl. .......................... 219/121 P; 315/133
[58] Field of Search ............... 219/121 P, 136, 130; 317/27 R; 315/111.2, 120, 127, 132, 133, 136

[56] References Cited

U.S. PATENT DOCUMENTS

| | | | |
|---|---|---|---|
| 3,745,321 | 7/1973 | Shapiro et al. | 219/121 P |
| 3,748,537 | 7/1973 | Vigini | 317/27 R |
| 3,838,242 | 9/1974 | Goucher | 219/121 P |
| 3,914,575 | 10/1975 | Eicher | 219/121 P |

Primary Examiner—J. V. Truhe
Assistant Examiner—Clifford C. Shaw
Attorney, Agent, or Firm—James C. Arvantes

[57] ABSTRACT

A fault detector system which is capable of monitoring certain key parameters in the starting operation of a plasma arc working apparatus and which can automatically stop the starting operation once a fault or malfunction has been detected. The system includes means for sensing the input signal to a high frequency AC generator, the pilot arc current once the pilot arc has been ignited and the arc voltage after the main arc has been established. The sensing means produce signals representing the presence of these starting parameters which signals are then fed to conventional timers. The timers measure the duration of the signals or combination of signals such that if a fault or malfunction occurs and lasts for a predetermined time period, the timers produce output signals which are then fed to logic circuits. The logic circuits in turn produce output signals which represent the fault or malfunction. These output signals are fed to storage devices which hold the signals and activate switch means for automatically stopping the starting operation of the apparatus. Preferably, the system also includes means for visually indicating that a fault or malfunction has occurred and also for indicating the type and nature of the fault or malfunction.

9 Claims, 2 Drawing Figures

FIG. I

FAULT DETECTOR SYSTEM FOR STARTING PLASMA ARC WORKING APPARATUS

BACKGROUND

The present invention relates to a fault detector system for starting a plasma arc working apparatus.

Plasma arc working apparatus of the type to which the present invention pertains are widely used in applications for cutting metallic workpieces. Typical plasma arc working apparatus are disclosed in U.S. Pat. No. 2,806,124 to R. M. Gage and U.S. Pat. No. 3,366,772 to R. J. Wickham et al. Such apparatus usually comprise a torch having a non-consumable electrode and a nozzle. An electric arc is established between the electrode and the workpiece from a suitable DC power supply. Gas passes through the torch around the electrode and the arc and out through a constricting passage in the nozzle. The gas is heated by the energy of the arc to create a plasma stream which combines with the arc to cut the workpiece. Since the plasma arc reaches extremely high temperatures, a coolant such as water is passed through the nozzle around the arc constricting passage. Coolant may also be passed around the plasma arc to further constrict the arc and prevent damage to the nozzle by high temperatures.

Most plasma arc torches are conventionally started by a small pilot arc in close proximity to the torch electrode. The pilot arc is maintained directly in the path of the gas as it passes around the electrode. With an arc voltage established between the electrode and workpiece from the DC power supply, the pilot arc ionizes a portion of the gas which facilitates transfer of the pilot arc to the main arc between the electrode and workpiece. The pilot arc is ignited and maintained from a separate pilot arc current source and a high frequency AC generator. Once the main arc has been established, the pilot arc is extinguished.

Certain malfunctions may occur from time to time during the starting operation of a plasma arc working apparatus. A typical malfunction may be, for example, a failure to establish a main arc voltage from the DC power supply with the result that no main arc is struck. Another typical malfunction may be a failure to ignite the pilot arc. Still another malfunction may be a failure of the pilot arc once ignited to transfer the main arc across the torch electrode and workpiece. Other malfunctions may also occur such as a failure in the flow of gas and coolant through the torch.

When a fault or malfunction occurs during the starting operation, it is necessary for the operator to completely shut down the plasma arc working apparatus. If the proper procedures are not followed, damage to the apparatus may occur and the operator may be exposed to the hazards of dangerously high voltages.

SUMMARY

The present invention is directed to a fault detector system which is capable of monitoring certain key parameters in the starting operation of a plasma arc working apparatus and which can automatically stop the starting operation once a fault or malfunction has been detected. The system includes means for sensing the input signal to the high frequency AC generator, the pilot arc current once the pilot arc has been ignited and the arc voltage after the main arc has been established. The sensing means produce signals representing the presence of the starting parameters which signals are then fed to conventional timers. The timers measure the duration of the signals or combination of signals such that if a fault or malfunction occurs and lasts for a predetermined time period, the timers produce output signals which are then fed to logic circuits. The logic circuits in turn produce output signals which represent the fault or malfunction. These output signals are fed to storage devices which hold the signals and activate switch means for automatically stopping the starting operation of the apparatus. Preferably, the system also includes means for visually indicating that a fault or malfunction has occured and also for indicating the type and nature of the fault or malfunction.

An additional feature of the present invention is the provision of a fault detector system which further includes means for resetting the switch means after a fault or malfunction has been detected and which combines with an anti-defeat device for preventing resetting of the switch means until after the fault or malfunction has been corrected.

DESCRIPTION OF THE PREFERRED EMBODIMENTS

Figure 1:
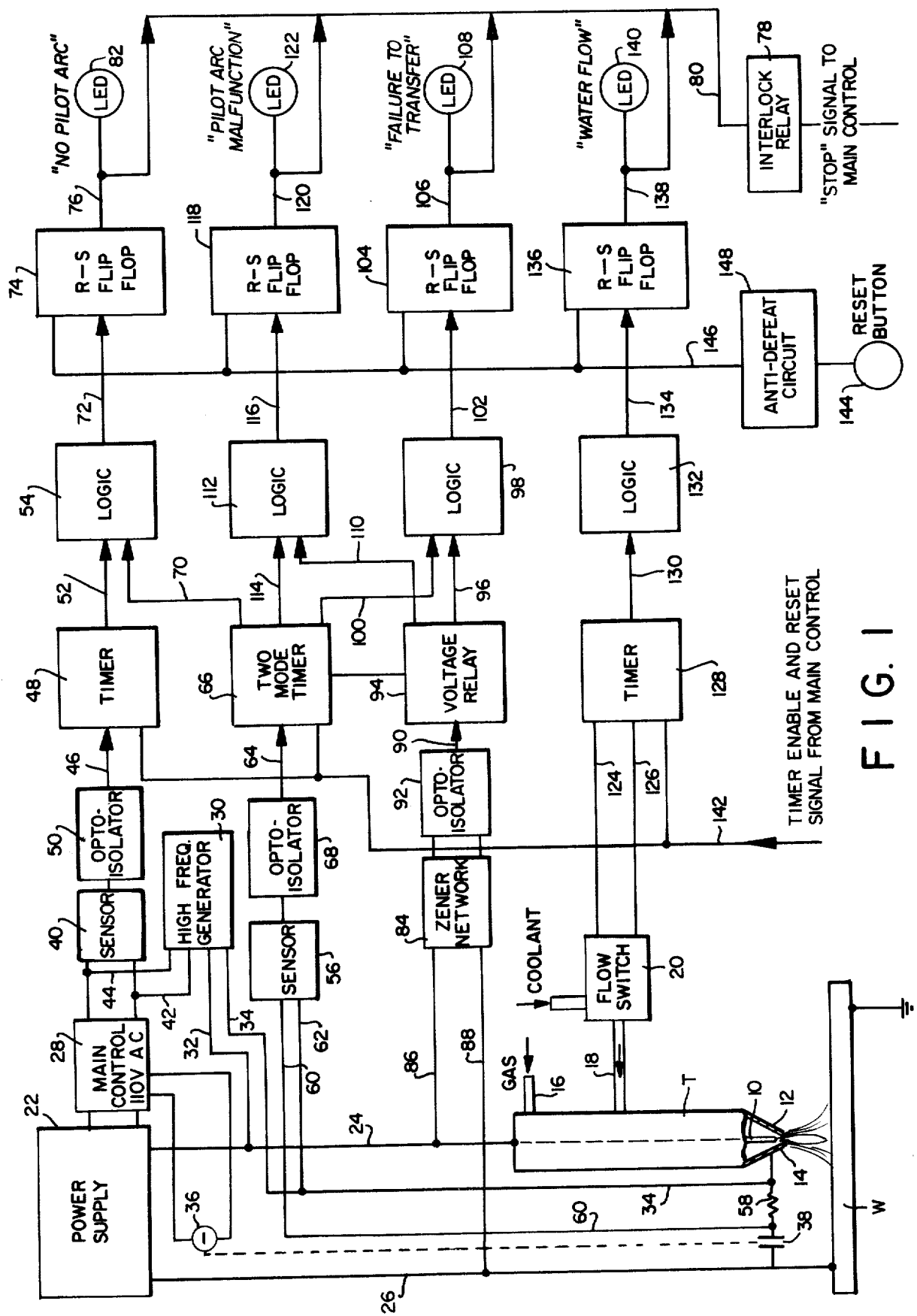
FIG. 1 in the accompanying drawing is a schematic representation of a plasma arc working apparatus and the fault detector system of the present invention.

Referring now to the drawing and particularly to FIG. 1, a plasma arc working apparatus is shown including a plasma arc torch T having a non-consumable electrode 10 which is positioned inside a nozzle 12 having an arc constricting passage 14. Gas is fed to the torch T through a gas inlet 16 from a suitable gas supply, not shown. Coolant such as water is also fed to the torch T through a coolant inlet 18. The coolant is fed from a suitable supply, also not shown, through a conventional flow switch 20. The apparatus further includes a high voltage DC power supply 22 which is connected in series with the electrode 10 and workpiece W by power cables 24, 26, a main control circuit 28 and a high frequency AC generator 30. One output terminal of the high frequency AC generator 30 is connected to the positive power cable 26 by lead 32 while the other output terminal is connected to the torch nozzle 12 by lead 34.

The starting operation for the plasma arc working apparatus is controlled by the control circuit 28 which may be of conventional design. The control circuit 28 is coupled to both the DC power supply 22 and the high frequency AC generator 30. On start up a signal is fed from the control circuit 28 to the power supply 22 which then estabishes a main arc voltage across the torch electrode 10 and workpiece W. Another signal is also fed to the high frequency AC generator 30 which in turn establishes an arc path between the nozzle 12 and the torch electrode 10. Once this arc path has been established, the pilot arc should strike and pilot arc current will flow in the circuit. Additional signals are also produced by the control circuit 28 to start the flow of both gas and coolant. Once the pilot arc has been struck and transfers the main arc between the torch electrode 10 and workpiece W, the pilot arc is extinguished immediately by the control circuit 28. This may be readily accomplished by a relay coil 36 having contact 38 which break connection with the lead 34 from the high frequency AC generator 30.

In accordance with the present invention the starting operation is continuously monitored by a fault detector system which includes means for sensing the key starting parameters, e.g. input signal to the high frequency AC generator 30, pilot arc current and main arc voltage between the electrode 10 and workpiece W. Optionally, the system may also include means for sensing the flow of coolant and/or gas to the torch T.

A sensor 40 is connected across the input terminals 42, 44 of the high frequency AC generator 30. The sensor 40 monitors the input signal to the generator 30 from the control circuit 28. When this input signal is present, the sensor 40 produces an output signal 46 which is fed to an electric timer 48. This signal is fed through an opto-isolator 50 which optically couples the sensor 40 to the timer 48 and prevents damage to the timer by high voltages. The timer 48 in turn produces an output signal 52 which is then fed to a logic block 54. The timer 48 sets the duration of this signal to a predetermined time period, e.g. 2.5 seconds.

Another sensor 56 is connected across a pilot arc resistor 58 by leads 60, 62. When the pilot arc ignites, pilot arc current begins to flow and a voltage drop occurs across the resistor 58. The sensor 56 senses this voltage drop and hence the pilot arc current and produces an output signal 64 which is fed to an electronic two-mode timer 66. This signal is also fed through an opto-isolator 68 which optically couples the sensor 56 to the timer 66. Two-mode timer 66 in turn produces an output signal 70 which is also fed to the logic block 54, indicating that the pilot arc has ignited.

If the pilot arc fails to ignite and no signal is fed from the two-mode timer 66 within the predetermined time period set by the timer 48, e.g. 2.5 seconds, the logic block 54 then produces an output signal 72 which is fed to an R-S flip-flop 74. The R-S flip-flop 74 functions as a signal storage device holding the signal 72 at one mode level while at the same time feeding a signal 76 to an interlocking relay 78 via an input lead 80. This signal activates the relay and initiates a "stop" signal to the control circuit 28. The signal 76 is sustained until the R-S flip-flop 74 is reset. Signal 76 also activates an LED 82 visually indicating "No Pilot Arc".

In the event the pilot arc does ignite, a fault or malfunction may still occur in that the pilot arc fails to transfer the main arc between the torch electrode 10 and workpiece W. If such a fault or malfunction should occur, the pilot arc should not be allowed to burn for an extended period of time, e.g. no more than about 1.5 seconds. A sensor network 84 is connected by leads 86, 88 across the electrode 10 and workpiece W. Before the main arc ignites, the sensor network 84 senses the full open circuit voltage of the power supply 22. Sensor network 84 contains an arrangement of zener diodes whose characteristics are such that it will cease conduction when the sensor network 84 senses the arc voltage when the main arc is struck between the electrode 10 and workpiece W. Before the main arc is struck, the zener diodes are in a conducting state and sensor network 84 produces a signal 90 which is fed through opto-isolator 92 to the voltage relay 94. When the main arc is struck and the zener diodes cease conduction, the sensor network 84 produces a voltage change at its output which is applied across the input of the opto-isolator 92. Opto-isolator 92 then ceases to feed the output signal 90 to the voltage relay 94. The absence of this signal trips the voltage relay 94 which in turn feeds a signal 96 to a logic block 98, indicating that the main arc has been ignited.

At the instant of time when the signal 64 is fed to the two-mode timer 66 from the pilot arc sensor 56, the timer 66 produces in turn an output signal 100 which is also fed to the logic block 98 indicating that the pilot arc has ignited. Two-mode timer 66 sets the duration of the output signal 100 to a predetermined time period, e.g. 1.5 seconds, with the mode being selected by the state of the voltage relay 94.

If the pilot arc fails to transfer the main arc between the electrode 10 and workpiece W and no signal is fed from the voltage relay 94 within the predetermined time period set by the two-mode timer 66, the logic block 98 then produces an output signal 102 which is fed to an R-S flip-flop 104. The R-S flip-flop 104 then in turn feeds a signal 106 to the interlocking relay 78 via input lead 80. This signal activates the relay and initiates a "stop" signal to the control circuit 28. Again the signal 106 is sustained until the R-S flip-flop 104 is reset. The signal 106 also activates an LED 108 visually indicating "Failure To Transfer".

Assuming the pilot arc transfers the main arc between the electrode 10 and workpiece W, the pilot arc is then extinguished by a signal fed from the control circuit 28 to the relay coil 36 which activates contacts 38. The pilot arc should be extinguished immediately within a short period, e.g., no more than a one-half second time interval. When the signal 90 is fed to the voltage relay 94 from the sensor network 84, the voltage relay 94 upon tripping produces an output signal 110 which is fed to a logic block 112, indicating that the main arc has been ignited. Similarly, at the instant of time when the signal 64 is fed to the two-mode timer 66 from the pilot arc sensor 56, the timer 66 times the duration of the pilot arc. Two-mode timer 66 sets the duration of the pilot arc to a predetermined time period, e.g. 0.5 seconds. If the pilot arc does not terminate within this predetermined time period, the timer feed an output signal 114 to the logic block 112 which produces an output signal 116 which is fed in turn to an R-S flip-flop 118. The R-S flip-flop 118 in turn feeds a signal 120 to the interlocking relay 78 via input lead 80 which activates the relay and initiates a "stop" signal to the control circuit 28. The signal 120 also activates an LED 122 visually indicating "Pilot Arc Malfunction".

Optionally, the fault detector system of the present invention may also include means for detecting a fault or malfunction in the flow of coolant or gas to the torch T. As shown, such means may include the flow switch 20 which is incorporated in the coolant inlet 18 from the coolant supply. The output from the flow switch 20 is fed by leads 124, 126 to an electronic timer 128. If the flow of coolant should stop or fall below a predetermined flow rate and this fault or malfunction is continued for a predetermined time period set by a timer 128, an output signal 130 is fed from the timer 128 to a logic block 132. The logic block 132 then produces an output signal 134 which is fed in turn to an R-S flip-flop 136. The R-S flip-flop 136 produces a signal 138 which is also fed to the interlocking relay 78 via input lead 80, activating the relay and initiating a "stop" signal to the control circuit 28. Signal 138 also activates an LED 140 visually indicating "Water Flow".

It should be noted that basically the same circuitry may be used to detect a fault or malfunction in the flow of gas to the torch T. Although not shown, a flow switch may be incorporated in the gas inlet 16 from the gas supply. A signal from the flow switch indicating a fault in the gas flow may be similarly fed to an electronic timer which sets a predetermined time period for detection of the fault. The output signal from the timer is then fed to a logic block which produces an output signal to an R-S flip-flop. The R-S flip-flop then activates the interlocking relay.

Timers 48, 66 and 128 may be conventional electronic timers employing resistance and capacitance networks having specific RC time constants. Similarly, logic blocks 54, 98, 112 and 132 may be logic circuitry employing conventional gate networks.

Means are also provided in the fault detector system for enabling and resetting the timers 48, 66 and 128 during start-up of the apparatus. Such means may be conventional circuitry capable of feeding an enabling and reset signal from the control circuit 28 to each one of the timers as generally denoted by the reference numeeral 142.

The fault detector system further includes means for resetting the R-S flip-flops 74, 104, 118, and 136 upon activating a reset button 144. Again, conventional circuitry may be used to feed a reset signal to each one of the timers as generally denoted by the reference number 146.

An important feature of the present invention is the provision of an anti-defeat circuit 148 which prevents the R-S flip-flops from being reset until the fault or malfunction has been corrected. This anti-defeat circuit includes a resistance and capacitance network which is so arranged that the capacitance charges up upon activating the reset button 144 but prevents resetting of the R-S flip-flops if the fault is still present. The circuit also prevents disabling the R-S flip-flops by holding in the reset button.

Figure 2:
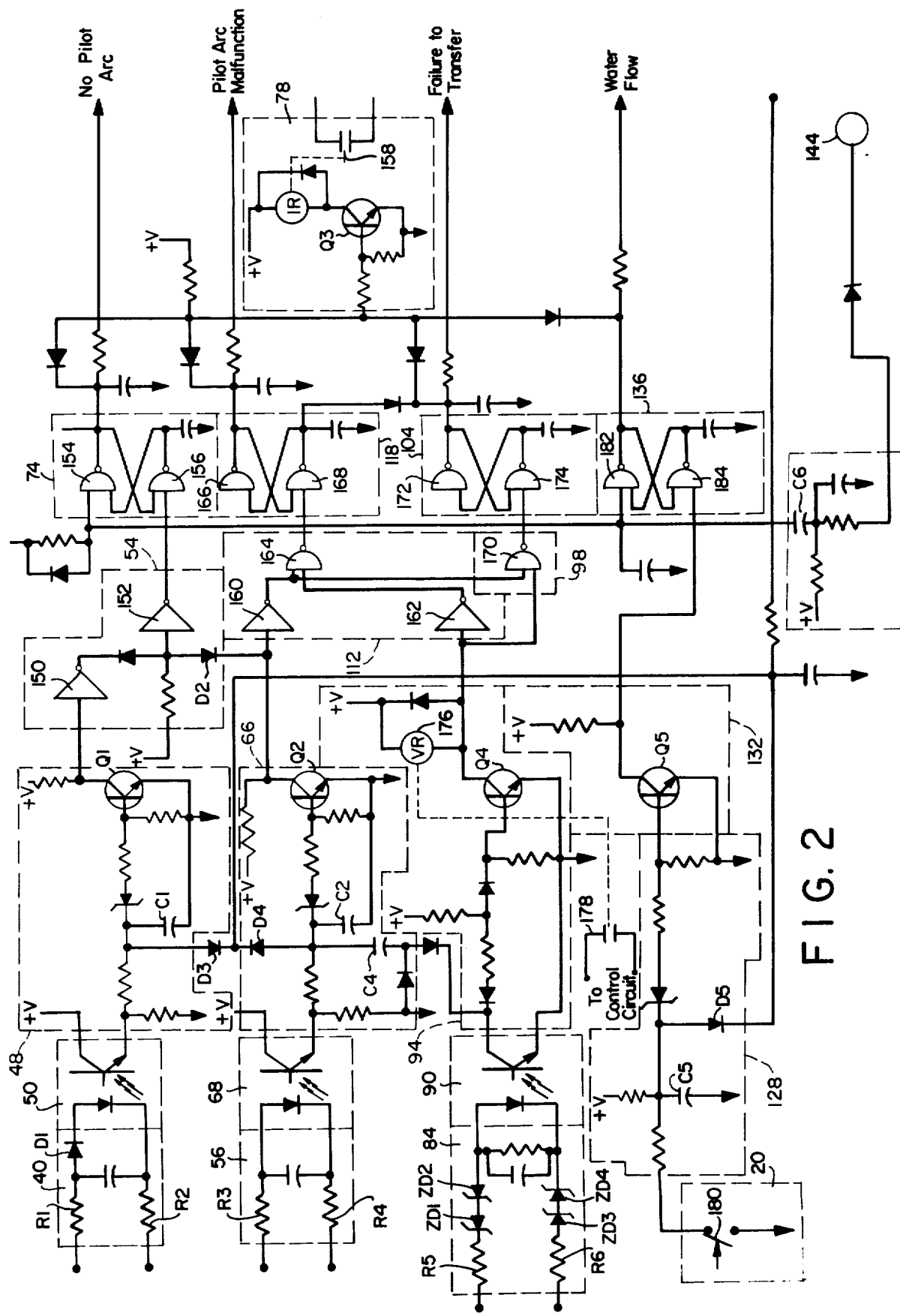
FIG. 2 is a detailed circuit diagram of a preferred embodiment of the fault detector system.

FIG. 2 shows a preferred embodiment of a circuit for the fault detector system of the present invention. As shown, the input signal from the high frequency AC generator is fed through dropping resistors R1 and R2 in the sensor 40. Diode D1 rectifies this signal and applies it to the input of opto-isolator 50. This causes the transistor in opto-isolator 50 to pulse on and off 60 times a second. These pulses are fed to the timer 48 and eventually charge up capacitor C1 in 2 to 3 seconds and turns on the transistor Q1. The collector of transistor Q1 goes low and produces an output signal which is fed to logic block 54 giving a low in the input of the inverter 150. This gives a high on the output of inverter 150. Assuming that the collector of transistor Q2 in two-mode timer 66 is in a high state indicating that the pilot arc has not ignited, a high appears on the input of inverter 152. This causes a low on the output of the same gate which sets the R-S flip-flop consisting of gates 154, 156. This in turn causes a low to appear on the output of gate 154 actuating the "No Pilot Arc" LED 82 and also feeding a signal to the interlock relay 78. This signal shorts out the base drive to transistor Q3 causing the contacts 158 to open.

The voltage drop across the pilot arc resistor 58 is applied to the input of sensor 56. This signal is fed through dropping resistors R3, R4 and to the input of opto-isolator 68. A voltage drop of about 40 volts is required to turn on the transistor in sensor 56. Capacitor C2 charges up in about 0.5 seconds. If the transistor in opto-isolator 92 coupled to sensor 84 is turned on, indicating that the main arc has not been ignited (i.e., a high voltage appears across the electrode 10 and workpiece W), capacitor C4 which is in the circuit makes the charging time about 1.5 seconds. In either event, a low appears at the collector of transistor Q2 locking out the "No Pilot Arc" circuit via diode D2. This causes a high to appear on the output of inverter 160. If the collector of transistor Q4 in two-mode timer 66 is low indicating that the main arc has ignited (i.e., a low voltage appears across electrode 10 and workpiece W), a high appears on the output of inverter 162 and also on the input of gate 164. This causes a low to appear at the output of gate 164 which sets the R-S flip-flop 118 consisting of gates 166, 168, actuating the "Pilot Arc Malfunction" LED 122 and dropping out interlock relay 78. In this instance, only capacitor C2 is in the circuit so that the charge time is 0.5 seconds. If the collector of transistor Q4 is high indicating a high voltage at the torch and no main arc, a high appears on the inputs of gate 170 setting the R-S flip-flop 104 consisting of gates 172, 174. This actuates the "Failure to Transfer" LED 108 and opens contacts 158 of interlock relay 178. Voltage relay 176 trips and causes capacitor C4 to be in the circuit making a charge time of 1.5 seconds.

When the main arc is struck, the arc voltage is applied to the input of sensor 84. This signal is fed through limiting resistors R5, R6 and zener diodes ZD1-ZD4. The zener diodes determine the threshold voltage at which current is applied to the light emitting diode in opto-isolator 92. This voltage is about 300 volts. The transistor in sensor 92 turns on and this shunts the base drive away from transistor Q4 causing contacts 178 of voltage relay 94 to open. The transistor also brings capacitor C4 into the circuit. This is the condition when there is no main arc. When the main arc strikes, the arc voltage drops below the 300 volts threshold causing the contacts 178 of voltage relay 94 to close.

In the event there is a loss of coolant, the switch contact 180 in flow switch 20 opens causing capacitor C5 in timer 128 to charge up and the collector of transistor Q5 goes low. This signal sets the R-S flip-flop 136 consisting of gates 182, 184 causing the "Water Flow" LED 140 to activate and the contact 158 of interlocking relay 78 to open.

The reset button 144 resets all the R-S flip-flops 74, 104, 118 and 136 through coupling capacitor C6. Capacitor C6 prevents the reset button from being held in to defeat the interlocks. The main control circuit 28 includes contacts which reset and enable all the timers 48, 66 and 128 through diodes D3, D4 and D5 to allow various test functions to be performed without tripping the interlocks.

What is claimed is:

1. In combination: a plasma arc working apparatus including a torch having an electrode, a DC power supply connected in series between said electrode and the workpiece, means for igniting a pilot arc in close proximity to said electrode, said pilot arc ignition means including a high frequency pilot arc current source having an input, and a control circuit including means for extinguishing said pilot arc, wherein said apparatus is started by applying an input signal from said control circuit to said pilot arc current source whereupon pilot arc current flows in circuit with said pilot arc ignition means to ignite the pilot arc and whereupon said pilot arc transfers the main arc between said electrode and workpiece thereby establishing an arc voltage; and a fault detector system for monitoring key parameters in the starting operation of said apparatus and for automatically stopping the starting operation upon detection of a fault or malfunction, said system comprising, in combination:

sensing means for separately sensing the input signal to said pilot arc current source, the flow of pilot arc current and said arc voltage as key starting parameters, said sensing means being adapted to produce separate output signals representing the presence of said key parameters;

timer circuit means adapted to receive output signal from said sensing means and to produce a first output signal representing the presence of said input signal to said pilot arc current source, a second output signal representing said pilot arc current and a third output signal representing the pilot arc, said timer circuit means being adapted to set the duration of said first, second and third output signals to first, second and third predetermined time periods respectively;

a first logic circuit adapted to receive said first output signal from said timer circuit means and a signal from said sensing means representing the presence of said pilot arc current, and to produce an output signal when said sensing means signal fails to occur within said first predetermined time period indicating that said pilot arc has failed to ignite;

a second logic circuit adapted to receive said second output signal from said timer circuit means and a signal from said sensing means representing the presence of said arc voltage and to produce an output signal when said sensing means signal fails to occur within said second predetermined time period indicating that the main arc has fail to transfer;

a third logic circuit adapted to receive said third output signal from timer circuit means and a signal from said sensing means representing said pilot arc current and to produce an output signal when the duration of said sensing means signal exceeds said third predetermined tine period indicating that said pilot arc has failed to extinguish; and means adapted to receive said first, second and third output signals from said logic circuits and to produce output signals receivable by said control circuit for stopping the starting operation of said apparatus.

2. The combination in accordance with claim 1 wherein said apparatus includes means for introducing coolant into said torch from a coolant supply and wherein said detector system further includes sensing means for sensing the flow of said coolant and for producing a signal representing a fault in said coolant flow, timer circuit means adapted to receive said sensing means output signal and to produce an output signal when the duration of said sensing means output signal exceeds a predetermined time period, logic circuit means adapted to receive the output signal from said timer circuit means and to produce an output signal indicating said fault in said coolant flow and means adapted to receive the output signal from said logic circuit means and to produce an output signal receivable by said control circuit for stopping the starting operation of said apparatus.

3. The combination in accordance with claim 1 wherein said apparatus includes means for introducing gas into said torch from a gas supply and wherein said detector system further includes sensing means for sensing the flow of said gas and for producing a signal representing a fault in said gas flow, timer circuit means adapted to receive said sensing means output signal and to produce an output signal when the duration of said sensing means output signal exceeds a predetermined time period, logic circuit means adapted to receive the output signal from said timer circuit means and to produce an output signal indicating said fault in said gas flow and means adapted to receive the output signal from said logic circuit means and to produce an output signal receivable by said control circuit for stopping the starting operation of said apparatus.

4. The combination in accordance with claim 1 wherein said detector system includes a two-mode electronic timer in said timer circuit means adapted to receive the output signal from said sensing means representing said pilot arc current and a voltage relay adapted to receive the output signal from said sensing means representing said arc voltage, said two-mode electronic timer being further adapted to produce and set the duration of said output signal representing said pilot arc current in one mode of said voltage relay and to produce and set the duration of said output signal representing said pilot arc in the other mode of said voltage relay.

5. The combination in accordance with claim 1 wherein said detector system includes R-S flip-flop circuits adapted to receive output signals from said first, second and third logic circuits and to produce output signals in response thereto and an interlocking relay means for relaying the output signals from said R-S flip-flop circuits to said control circuit for stopping the starting operation of said apparatus.

6. The combination in accordance with claim 5 wherein said detector system includes means for visually indicating the fault or malfunction coupled to said R-S flip-flop circuits.

7. The combination in accordance with claim 5 wherein said detector system includes means for resetting said R-S flip-flop circuits after the fault or malfunction has been detected.

8. The combination in accordance with claim 7 wherein said detector system includes an anti-defeat device for preventing resetting of said R-S flip-flop circuits until after the fault or malfunction has been corrected.

9. The combination in accordance with claim 1 wherein said detector system includes means for resetting and enabling said timer circuit means coupled to said control circuit.

* * * * *